United States Patent
Lee et al.

(10) Patent No.: US 9,064,641 B2
(45) Date of Patent: Jun. 23, 2015

(54) ELECTRICAL ENERGY STORAGE DEVICE AND MANUFACTURING METHOD THEREOF

(71) Applicant: LS Mtron Ltd., Anyang, Gyeonggi-do (KR)

(72) Inventors: Ha-Young Lee, Suwon-si (KR); Jun-Ho Kim, Seoul (KR); Sang-Hyun Bae, Anyang-si (KR); Ji-Eun Kang, Anyang-si (KR)

(73) Assignee: LS MTRON LTD, Anyang, Gyeonggi-Do (KR)

( * ) Notice: Subject to any disclaimer, the term of this patent is extended or adjusted under 35 U.S.C. 154(b) by 0 days.

(21) Appl. No.: 14/287,439

(22) Filed: May 27, 2014

(65) Prior Publication Data

US 2014/0268496 A1    Sep. 18, 2014

Related U.S. Application Data

(62) Division of application No. 13/416,473, filed on Mar. 9, 2012, now Pat. No. 8,773,842.

(51) Int. Cl.
| | |
|---|---|
| *H01G 9/00* | (2006.01) |
| *H01G 11/74* | (2013.01) |
| *B23K 26/08* | (2014.01) |
| *B23K 26/28* | (2014.01) |
| *B23K 33/00* | (2006.01) |
| *H01G 11/82* | (2013.01) |

(52) U.S. Cl.
CPC ............ *H01G 11/74* (2013.01); *B23K 26/0823* (2013.01); *B23K 26/285* (2013.01); *B23K 33/006* (2013.01); *B23K 2201/12* (2013.01); *B23K 2201/38* (2013.01); *H01G 11/82* (2013.01); *Y02T 10/7022* (2013.01); *Y02E 60/13* (2013.01)

(58) Field of Classification Search
USPC ......... 361/502, 503–504, 509–512, 516–519, 361/525–529
See application file for complete search history.

(56) References Cited

U.S. PATENT DOCUMENTS

| | | | |
|---|---|---|---|
| 6,602,742 B2 | 8/2003 | Maletin et al. | |
| 7,164,574 B2 | 1/2007 | Barr et al. | |
| 7,474,520 B2 | 1/2009 | Kashihara et al. | |
| 7,586,288 B2 | 9/2009 | Onishi et al. | |
| 7,619,874 B2 | 11/2009 | Schmidt | |
| 8,098,481 B2 * | 1/2012 | Zong et al. | 361/502 |
| 8,130,487 B2 * | 3/2012 | Shimizu et al. | 361/519 |

(Continued)

FOREIGN PATENT DOCUMENTS

| | | |
|---|---|---|
| CN | 101652823 A | 2/2010 |
| EP | 0916443 | 5/1999 |
| JP | 2000-021365 | 1/2000 |
| JP | 2000-123818 | 4/2000 |
| KR | 10-2007-0043876 | 4/2007 |

*Primary Examiner* — Nguyen T Ha
(74) *Attorney, Agent, or Firm* — LRK Patent Law Firm (57) ABSTRACT

Disclosed is an electrical energy storage device provided with a metallic casing to receive a bare cell and first and second terminals located outside of the metallic casing corresponding to each electrode of the bare cell, including a plate-like member provided on at least one of the first and second terminals, an inner terminal contacting the plate-like member to form the boundary between the inner terminal and the plate-like member, and a laser welded portion formed along the boundary between the inner terminal and the plate-like member to connect the plate-like member with the inner terminal.

9 Claims, 8 Drawing Sheets

(56) References Cited

U.S. PATENT DOCUMENTS

| | | |
|---|---|---|
| 8,233,267 B2 | 7/2012 | Miura et al. |
| 8,451,586 B2 * | 5/2013 | Priban .......................... 361/508 |
| 2001/0005708 A1 | 6/2001 | Iwai et al. |
| 2009/0223940 A1 | 9/2009 | Hosoya |
| 2010/0226068 A1 | 9/2010 | Kitagawa et al. |

* cited by examiner

ELECTRICAL ENERGY STORAGE DEVICE AND MANUFACTURING METHOD THEREOF

CROSS-REFERENCE TO RELATED APPLICATION(S)

This application is a divisional of U.S. application Ser. No. 13/416,473, filed Mar. 9, 2012, which is incorporated herein by reference, which claims priority to Korean Patent Application Nos. 10-2011-0022012, 10-2011-0022013, and 10-2011-0022015, filed on Mar. 11, 2011, the entire disclosures of which are incorporated herein by reference.

BACKGROUND

1. Field

Exemplary embodiments relate to an electrical energy storage device and manufacturing method thereof, and more particularly, to an electrical energy storage device with improved connection structure between an outer terminal and an inner terminal and manufacturing method thereof.

2. Description of the Related Art

Generally, an ultracapacitor, also known as a supercapacitor, is an energy storage device having characteristics in between those of an electrolytic condenser and a secondary battery. Since an ultracapacitor has high efficiency and a semipermanent life span, the ultracapacitor is considered as a next-generation energy storage device that is useable in parallel with or in replace of a secondary battery.

An ultracapacitor can also be used to replace a storage battery in applications that are not easy to maintain and that require a long service life. Since an ultracapcitor has quick charging/discharging characteristics, the ultracapacitor is very suitable as a main or auxiliary power supply of electric vehicles, road indicator lamps, or uninterrupted power supplies (UPSs) that requires high capacity, as well as an auxiliary power supply of mobile communication information equipment such as mobile phones, laptop computers, or personal digital assistants (PDAs), and thus has been widely being used as the same.

Figure 1:
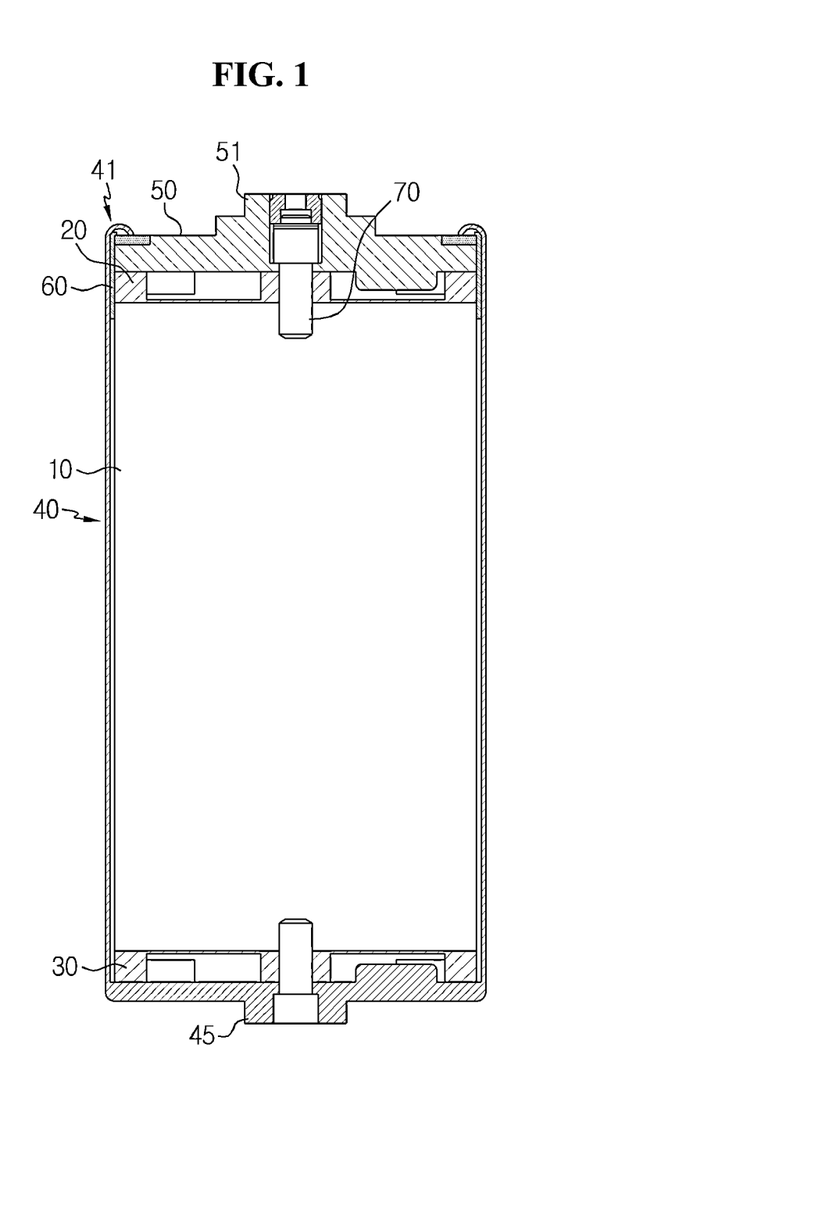
FIG. 1 is a partial cross-sectional view illustrating a conventional ultracapacitor.

As shown in FIG. 1, an ultracapacitor mainly has a cylindrical shape for minimization.

Referring to FIG. 1, a cylindrical ultracapacitor includes an internal housing 10 that accommodates a bare cell composed of a cathode, an anode, a separator, and an electrolyte, a metallic casing 40 that receives the internal housing 10, inner terminals 20 and 30 located at the upper and lower portions of the metallic casing 40 to connect to the anode and the cathode of the bare cell, respectively, and an outer anode terminal 51 and an outer cathode terminal 45 located at the top and bottom of the metallic casing 40, respectively.

In the cylindrical ultracapacitor, the inner anode terminal 20 is electrically isolated from the metallic casing 40 by an insulating member 60 and electrically connected to the outer anode terminal 51 located in the middle of a plate-like member 50, and the inner cathode terminal 30 is electrically connected to the metallic casing 40.

Conventionally, the connections between the inner anode terminal 20 and the plate-like member 50, and between the inner cathode terminal 30 and the metallic casing 40 are made using a bolt 70. However, a connection between an inner terminal and an outer terminal using the bolt 70 has disadvantages of a complicated assembly process and low connection stability.

Particularly, since the outer anode terminal 51 is formed with an electrolyte injection hole at the center thereof and has components such as a safety valve and the like, it is not easy to apply a bolt to the outer anode terminal 51.

To solve this problem, suggestion has been made to weld, using a hot compress, the surface of the plate-like member 50 provided with the outer anode terminal 51 and the corresponding surface of the inner anode terminal 20. However, this involves a complicated welding process, and since the connected part between the outer anode terminal 51 and the inner anode terminal 20 is weak against the external vibration, the outer anode terminal 51 and the inner anode terminal 20 may easily separate from each other, which will deteriorate the contact resistance characteristics.

On the other hand, since the inner cathode terminal 30 directly contacts the metallic casing 40, it is very important to minimize the contact resistance between the inner cathode terminal 30 and the metallic casing 40 and stabilize the contact state therebetween to improve the electrical characteristics of the ultracapacitor.

Meanwhile, a side reaction may occur at the interference between the electrolyte and the electrode of the ultracapacitor at room temperature under abnormal conditions such as overcharge, overdischarge, overvoltage, and the like, and as a result, gas is generated. When gas accumulates in the ultracapacitor, the internal pressure of the metallic casing 40 increases and finally swells the metallic casing 40. In some cases, when gas abruptly discharges through a weak area of the metallic casing 40, the metallic casing 40 may explode.

In particular, the metallic casing 40 swells more severely at the side and the bottom of the metallic casing 40 near the inner cathode terminal 30 than in the vicinity of the inner anode terminal 20.

Since the metallic casing 40 has a curled portion 41 formed on the top thereof near the inner anode terminal 20, it is easy to reinforce the pressure resistance performance of the side of the metallic casing 40 near the inner anode terminal 20 by controlling an amount of curling, however since a curled portion is not formed in the vicinity of the outer cathode terminal 45, it is not easy to reinforce the pressure resistance performance of the side of the metallic casing 40 near the outer cathode terminal 45.

SUMMARY OF THE INVENTION

The present invention is designed to solve the above problems, and therefore it is an object of the present invention to provide an electrical energy storage device with improved connection strength and resistance characteristics by precision welding between an outer terminal and an inner terminal, and manufacturing method thereof.

It is another object of the present invention to provide an electrical energy storage device with improved resistance characteristics by increasing the contact area and contact stability between a metallic casing and an inner terminal, and manufacturing method thereof.

It is still another object of the present invention to provide an electrical energy storage device with improved pressure resistance performance by optimizing a thickness distribution of a metallic casing.

To achieve the object of the present invention, provided is an electrical energy storage device provided with a metallic casing to receive a bare cell and first and second terminals located outside of the metallic casing corresponding to each electrode of the bare cell, including a plate-like member provided on at least one of the first and second terminals, an inner terminal contacting the plate-like member to form the boundary between the inner terminal and the plate-like member, and a laser welded portion formed along the boundary between the inner terminal and the plate-like member to connect the plate-like member with the inner terminal.

Preferably, the laser welded portion is made up of a plurality of welding points repeatedly formed along the boundary between the plate-like member and the inner terminal, and a distance between the centers of adjacent welding points is within the diameter of the welding points.

A beading groove may be formed along the outer periphery of the inner terminal, and the metallic casing may have a bead portion closely contacting the beading groove.

A rounded corner may be formed between the bottom and the side of the metallic casing to control the internal pressure, and a slope portion may be formed on the inner terminal corresponding to the corner of the metallic casing.

The inner terminal may be provided corresponding to each of the first terminal and the second terminal, and any one of the inner terminals corresponding to the first terminal and the second terminal may closely contact the bead portion with an insulating member interposed therebetween and the other may directly contact the bead portion.

The metallic casing may have a thickness gradient over the side thereof such that the thickness of a portion near the second terminal is larger than the thickness of a portion near the first terminal.

Preferably, the side of the metallic casing has a thickness of a portion corresponding to the height of the inner terminal corresponding to at least the second terminal larger than the thickness of the other portion.

Preferably, a ratio of the thickness of the portion near the second terminal to the thickness of the portion near the first terminal is 120 to 150%.

A protrusion for concentricity may be formed at the center of at least one terminal of the metallic casing.

The protrusion for concentricity may be integrally formed with the body of the metallic casing.

According to another aspect of the present invention, provided is a method for manufacturing an electrical energy storage device provided with a metallic casing to receive a bare cell and first and second terminals located outside of the metallic casing corresponding to each electrode of the bare cell, including (a) preparing a subject for welding by contacting an inner terminal with a plate-like member provided on at least one of the first terminal and the second terminal, (b) aligning the subject with a beam radiating unit of a laser welding machine to radiate a laser beam on the boundary between the plate-like member and the inner terminal, and (c) performing laser welding on the boundary along the outer periphery of the subject while moving any one of the subject and the beam radiating unit relative to the other.

Preferably, step (c) includes repeatedly forming a plurality of laser welding points along the outer periphery of the subject while rotating the subject relative to the beam radiating unit at a predetermined rate.

Preferably, a distance between the centers of adjacent welding points is within the diameter of the welding points.

A beading groove may be formed along the outer periphery of the inner terminal.

The method may further comprise placing the inner terminal in the metallic casing, and beading a portion of the metallic casing corresponding to the inner terminal to form a bead portion that closely contacts the beading groove of the inner terminal.

A slope portion may be formed along the periphery edge of the inner terminal.

The inner terminal may be put in the metallic casing such that the slope portion faces the corner between the bottom and the side of the metallic casing.

BRIEF DESCRIPTION OF THE DRAWINGS

The accompanying drawing illustrates a preferred embodiment of the present disclosure and together with the foregoing closure, serves to provide further understanding of the technical spirit of the present disclosure. However, the present disclosure is not construed as being limited to the drawing.

DESCRIPTION OF THE PREFERRED EMBODIMENT

The present invention will now be described in detail with reference to the accompanying drawings. Prior to description, it should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible. Accordingly, the description proposed herein is just a preferable example for the purpose of illustrations only, not intended to limit the scope of the invention, so it will be apparent to those skilled in the art that various modifications and variation can be made in the present invention without departing from the spirit or scope of the invention.

Figure 2:
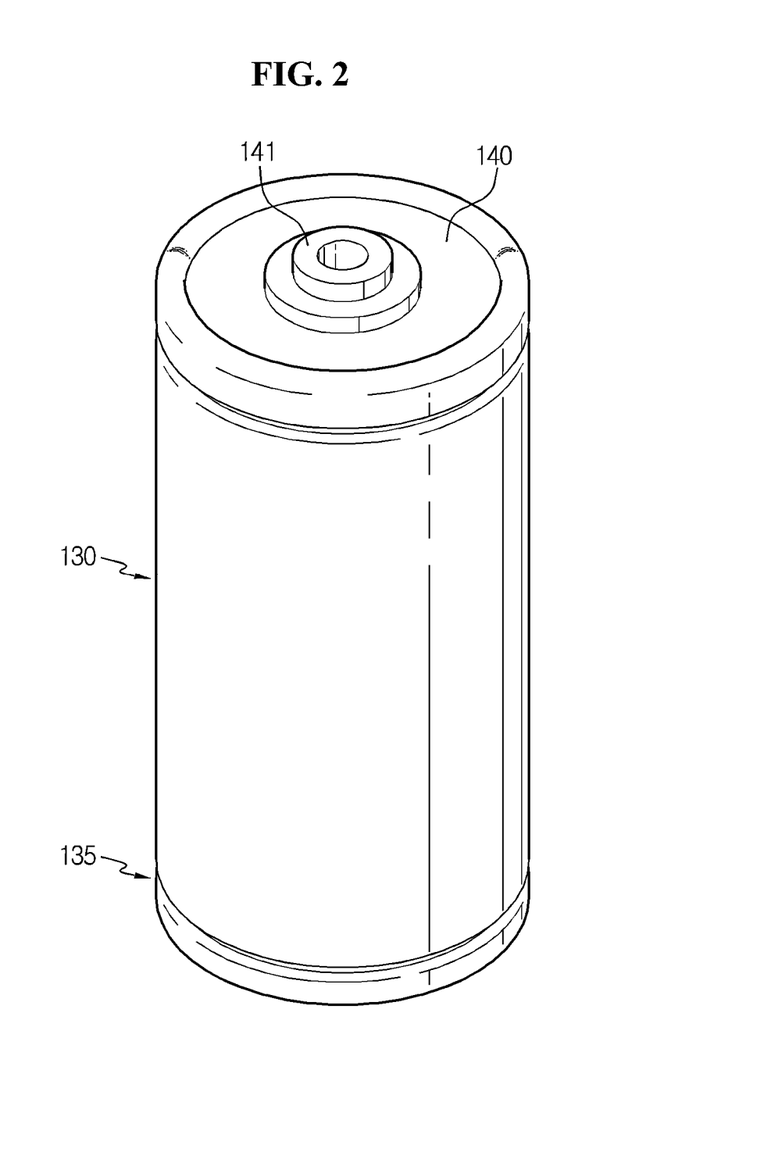
FIG. 2 is a perspective view illustrating an electrical energy storage device according to a preferred embodiment of the present invention.
Figure 3:
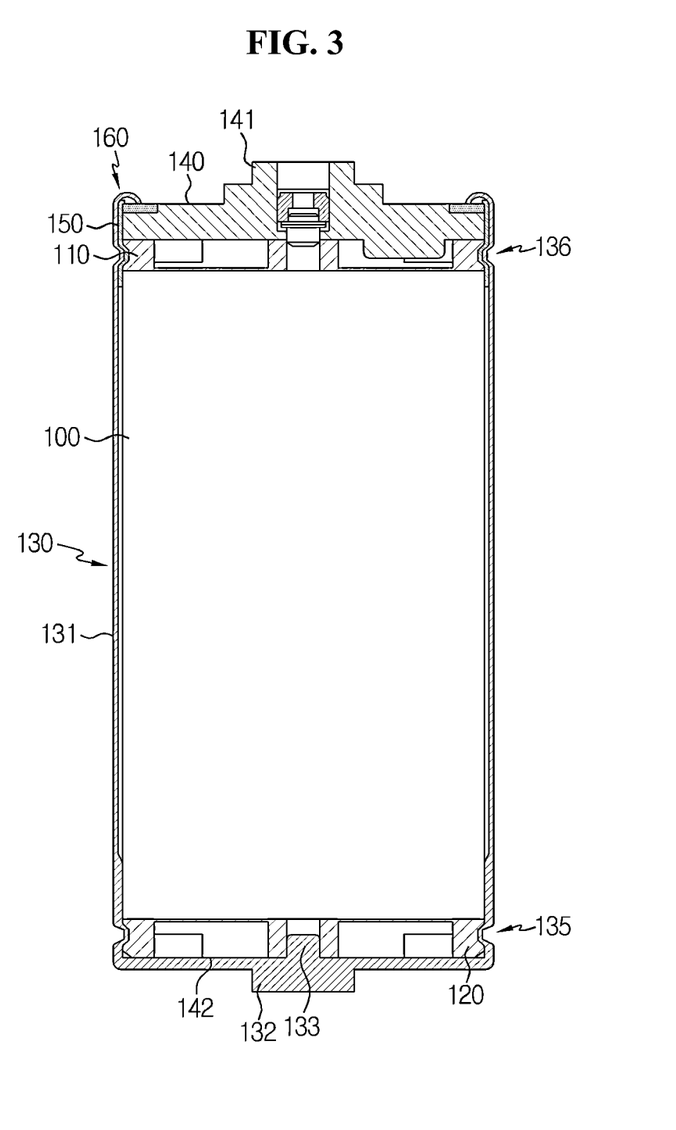
FIG. 3 is a partial cross-sectional view of FIG. 2.

FIG. 2 is a perspective view illustrating an electrical energy storage device according to a preferred embodiment of the present invention. FIG. 3 is a partial cross-sectional view of FIG. 2.

Referring to FIGS. 2 and 3, an electrical energy storage device according to a preferred embodiment of the present invention includes a metallic casing 130 that receives a bare cell (not shown), a first terminal or outer anode terminal 141 located outside of the metallic casing 130 corresponding to an anode of the bare cell, a second terminal or outer cathode terminal 132 located outside of the metallic casing 130 corresponding to a cathode of the bare cell, and an inner anode terminal 110 and an inner cathode terminal 120 respectively connected to the anode and the cathode of the bare cell in the metallic casing 130.

The bare cell includes a cathode, an anode, a separator, and an electrolyte, and provides an electrochemical energy storage function.

The inner anode terminal 110 and the inner cathode terminal 120 are respectively connected to the anode and the cathode of the bare cell. Each of the inner anode terminal 110 and the inner cathode terminal 120 has a circular plate shape with a circular outer periphery corresponding to the inner periphery of the metallic casing 130.

The inner anode terminal 110 is electrically isolated from the metallic casing 130 by an insulating member 150 and at the same time, contacts the plate-like member 140 and connects to the outer anode terminal 141 located in the middle of a plate-like member 140, and the inner cathode terminal 120 contacts the metallic casing 130 and connects to the outer cathode terminal 132 located in the middle of the bottom of the metallic casing 130.

The metallic casing 130 has a cylindrical body with an inner space in which the bare cell housed in an internal housing 100 after winding is received. Preferably, the metallic casing 130 has a cylindrical shape of aluminum. Although not shown, the metallic casing 130 preferably has a rounded corner between the bottom 142 and the side 131 thereof to improve the resistance to the internal pressure.

A protrusion 133 for concentricity is formed inside the center of the bottom 142 of the metallic casing 130 integrally extending from the side 131 of the metallic casing 130, and the outer cathode terminal 132 protrudes downwards outside of the center of the bottom 142 of the metallic casing 130.

A curled portion 160 is formed on the top of the metallic casing 130 near the inner anode terminal 110 to maximize the connection and sealing performances. The pressure resistance performance of the side 131 of the metallic casing 130 near the inner anode terminal 110 is easily controlled by adjusting the curling amount of the curl 160.

Additionally, bead portions 135 and 136 may be formed on the side 131 of the metallic casing 130 to fix the inner cathode terminal 120 and the inner anode terminal 110 to the metallic casing 130, respectively.

In the present invention, the connection between the plate-like member 140 provided with the outer anode terminal 141 and the inner anode terminal 110 is made by laser welding.

Figure 4:
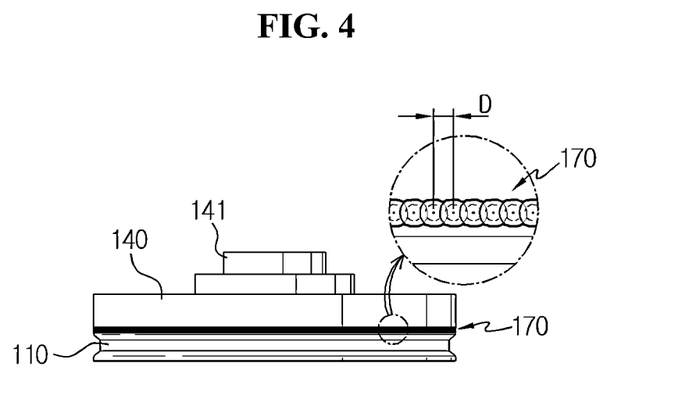
FIG. 4 is a partially enlarged side view of FIG. 2 illustrating a connection structure between a plate-like member provided with an outer anode terminal and an inner anode terminal.

FIG. 4 illustrates a terminal connection structure of the electrical energy storage device according a preferred embodiment of the present invention.

Referring to FIG. 4, the plate-like member 140 provided with the outer anode terminal 141 contacts with the inner anode terminal 110 of a plate shape, and a laser welded portion 170 is formed in the circular shape on the boundary along the outer periphery between the plate-like member 140 and the inner anode terminal 110. Here, the boundary is where laser welding is to be performed, and includes a microgap between the plate-like member 140 and the inner anode terminal 110, and circular periphery edges of the plate-like member 140 and the inner anode terminal 110 adjacent to the microgap.

The laser welded portion 170 is made up of a plurality of laser welding points formed repeatedly along the boundary between the plate-like member 140 and the inner anode terminal 110. Preferably, a plurality of the laser welding points overlap with each other to form a substantially continuous weld line. For this purpose, a distance D between the centers of adjacent welding points should be within the diameter of the welding points.

Figure 5:
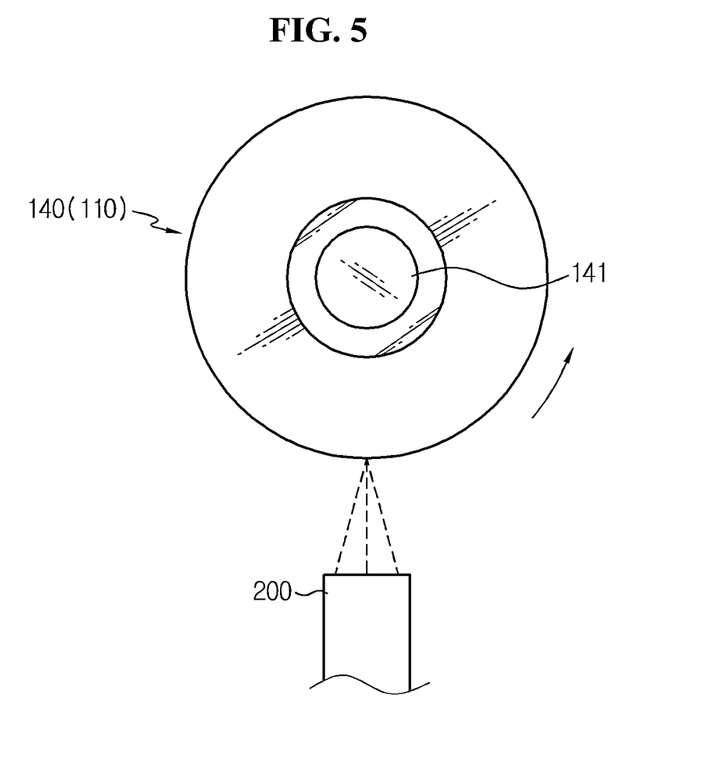
FIG. 5 is a schematic plane view illustrating a terminal welding process according to a preferred embodiment of the present invention.

FIG. 5 is a schematic plane view illustrating a terminal welding process according to a preferred embodiment of the present invention.

Referring to FIG. 5, the terminal welding process according to a preferred embodiment of the present invention includes preparing a subject for welding, aligning the subject with a laser welding machine, and performing laser welding along the outer periphery of the subject.

In the preparing step, the plate-like member 140 provided with the outer anode terminal 141 is stacked on top of the inner anode terminal 110.

In the aligning step, the side of the subject is aligned with a beam radiation unit 200 of the laser welding machine to radiate a laser beam on the circular boundary formed along the outer periphery as a result of the contact between the plate-like member 140 and the inner anode terminal 110.

In the laser welding step, the plate-like member 140 and the inner anode terminal 110 are welded with each other by performing laser welding along the outer periphery of the subject while rotating the subject relative to the beam radiation unit 200 at a predetermined rate. In this instance, laser welding is repeatedly performed to overlap a plurality of welding points at a predetermined pitch along the outer periphery of the subject.

Figure 6:
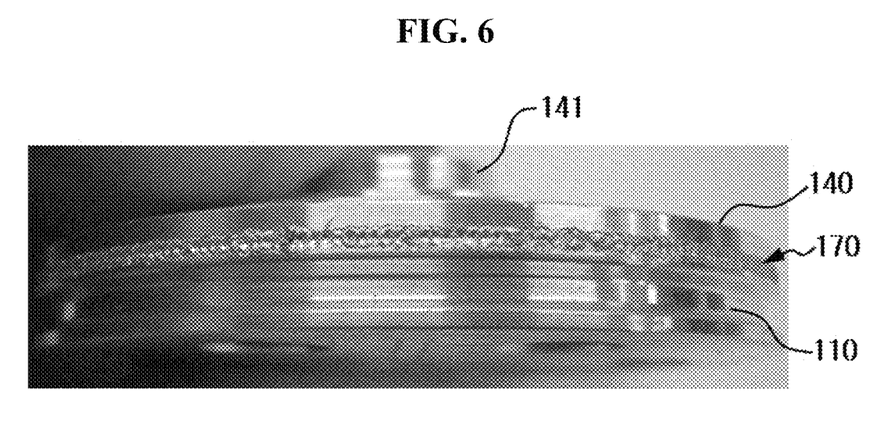
FIG. 6 is a photographic image illustrating a laser welded result between an outer anode terminal and an inner anode terminal according to the present invention.

FIG. 6 is a photographic image illustrating a laser welded result between the plate-like member 140 provided with the outer anode terminal 141 and the inner anode terminal 110 according to the present invention. As shown in FIG. 6, the laser welded portion 170 is formed as a substantially continuous weld line by the overlap of a plurality of the laser welding points formed along the boundary between the plate-like member 140 and the inner anode terminal 110.

According to the present invention, the electrical energy storage device can provide high connection strength by the laser welded portion 170 between the outer terminal and the inner terminal, and improvements in the resistance characteristics as a consequence of the close connection between the outer terminal and the inner terminal.

Referring to FIG. 3 again, the bead portion 135 is formed at a portion of the metallic casing 130 corresponding to at least the inner cathode terminal 120 and extends in the circular shape along the inner periphery of the metallic casing 130. The bead portion 135 closely contacts the outer periphery of the inner cathode terminal 120.

Figure 7:
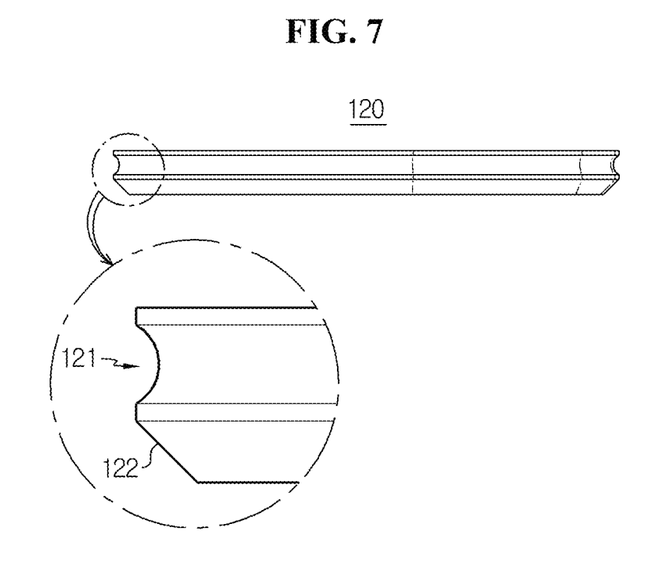
FIG. 7 is a partially enlarged side view of FIG. 3 illustrating an inner cathode terminal corresponding to an outer cathode terminal.

As shown in FIG. 7, a circular beading groove 121 is formed along the outer periphery of the inner cathode terminal 120. The beading groove 121 is used to receive the bead portion 135 of the metallic casing 130. The beading groove 121 can effectively increase the lateral surface area of the inner cathode terminal 120.

Preferably, a slope portion 122 is formed along the periphery edge of the inner cathode terminal 120 and corresponds to the rounded corner of the metallic casing 130 for controlling the internal pressure. The slope portion 122 prevents an increase in the contact resistance caused by the offset of the inner cathode terminal 120 due to the interference between the inner cathode terminal 120 and the rounded corner of the metallic casing 130 for controlling the internal pressure.

Preferably, like the inner cathode terminal 120, the inner anode terminal 110 has a beading groove formed along the outer periphery thereof to improve the connection with the metallic casing 130, and the metallic casing 130 has the bead portion 136 corresponding to the beading groove of the inner anode terminal 110. Preferably, the bead portion 136 of the metallic casing 130 contacts the beading groove of the inner anode terminal 110 with the insulating member 150 interposed therebetween.

The above-described electrical energy storage device may be manufactured by a process including electrode plate fabrication, electrode plate assembly, and housing assembly.

In the electrode plate fabrication and the electrode plate assembly, an electrode plate is fabricated by preparing an electrode active material, followed by mixing, coating, rolling, and slitting in a sequential manner, and winding the electrode plate together with a separator to make a bare cell.

In the housing assembly, the bare cell is dried under vacuum and then received in the metallic casing 130, followed by welding between the plate-like member 140 and the inner anode terminal 110, processing of the metallic casing 130 including beading and curling, and electrolyte injection into the metallic casing 130 and electrolyte impregnation.

In the beading of the metallic casing 130, the beading groove 121 is formed along the outer periphery of the inner cathode terminal 120 and the slope portion 122 is formed along the periphery edge of the inner cathode terminal 120. Next, the inner cathode terminal 120 is placed in the metallic casing 130 such that the slope portion 122 faces the corner between the bottom and the side of the metallic casing 130. Next, the bead portion 135 is formed by applying the pressure to the side of the metallic casing 130 corresponding to the inner cathode terminal 120 while moving a beading jig of a beading machine along the outer periphery of the metallic casing 130. Accordingly, the bead portion 135 formed on the side of the metallic casing 130 corresponding to the inner cathode terminal 120 is engaged with and closely contacts the beading groove 121 of the inner cathode terminal 120.

In this instance, the bead portion 136 formed on the side of the metallic casing 130 corresponding to the inner anode terminal 110 is engaged with and closely contacts the inner anode terminal 110 with the insulating member 150 interposed therebetween.

Figure 10:
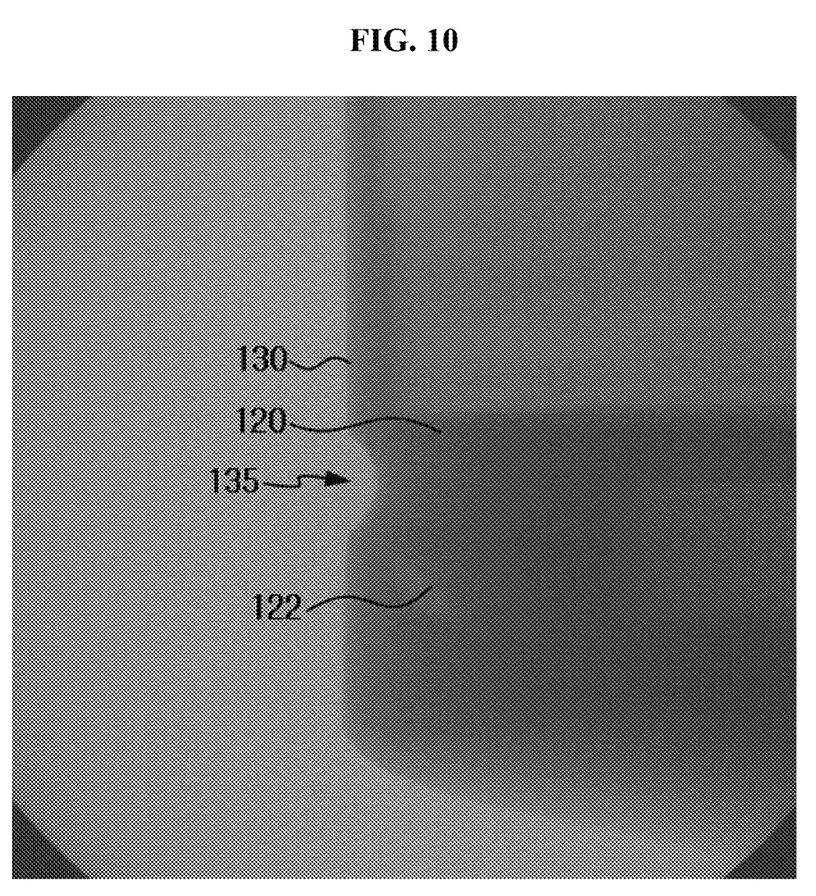
FIG. 10 is an actual X-ray image of an electrical energy storage device according to the present invention.

On the other hand, the bead portion 135 of the metallic casing 130 closely contacts the beading groove 121 of the inner cathode terminal 120 without a gap therebetween, thereby stably achieving a wider contact area than the conventional art, resulting in improved resistance characteristics (See FIG. 10).

Figure 8:
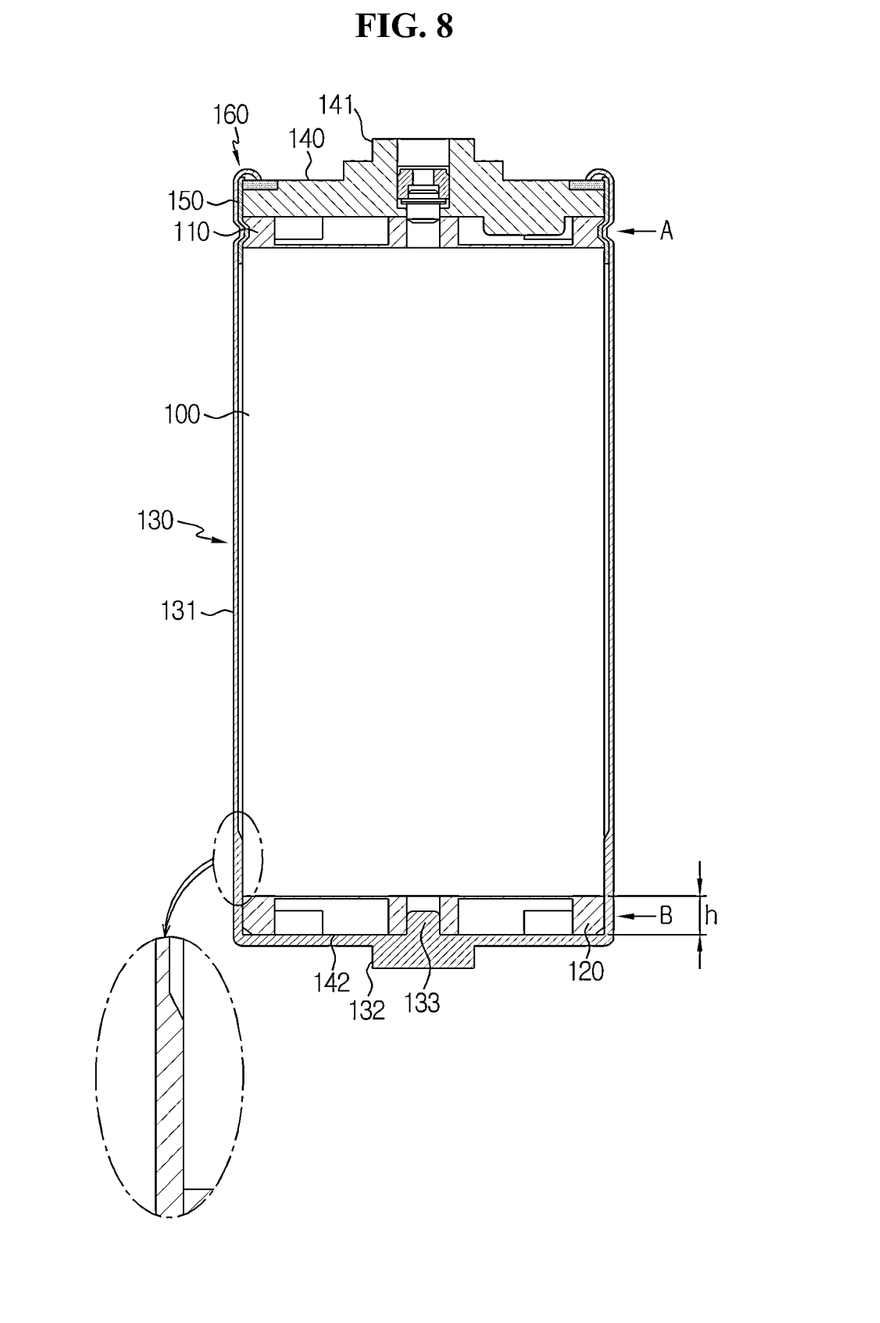
FIG. 8 is a partial cross-sectional view illustrating an electrical energy storage device according to another embodiment of the present invention.

FIG. 8 is a partial cross-sectional view illustrating an electrical energy storage device according to another embodiment of the present invention.

Referring to FIG. 8, the side 131 of the metallic casing 130 has a thickness gradient such that the thickness of the side 131 of the metallic casing 130 in the vicinity of the inner cathode terminal 120 is larger than that of the vicinity of the inner anode terminal 110. That is, the side 131 of the metallic casing 130 has a thickness of a portion B near the inner cathode terminal 120 larger than that of a portion A near the inner anode terminal 110.

Preferably, the thickness gradient is set such that the thickness of the portion corresponding to at least the height h of the inner cathode terminal 120 from the bottom 142 of the metallic casing 130 is larger than that of the portion A near the inner anode terminal 110. This structure compensates for a thickness loss that may occur to the side 131 of the metallic casing 130 corresponding to the inner cathode terminal 120 when beading is performed on the side 131 of the metallic casing 130 to establish a close connection between the metallic casing 130 and the inner cathode terminal 120, thereby preventing deterioration in the pressure resistance characteristics.

In the present invention, a relatively thick portion on the side 131 of the metallic casing 130 is not limited to a portion corresponding to the height h of the inner cathode terminal 120, and may extend to a predetermined distance in the direction facing away from the inner cathode terminal 120. Also, the thickness gradient over the side 131 of the metallic casing 130 may be sharp or gradual.

Preferably, the thickness gradient is set such that a ratio of the thickness of the portion B near the inner cathode terminal 120 to the thickness of the portion A near the inner anode terminal 110 is 120 to 150%. When the ratio is less than the minimum, the effect of reinforcing the vicinity of the inner cathode terminal 120 is insufficient, and when the ratio exceeds the maximum, it is not easy to assemble the internal components such as the bare cell and the like and perform a beading process and thus the contact state between the terminals 110 and 120 and the metallic casing 130 becomes unstable, resulting in increased resistance.

Figure 9:
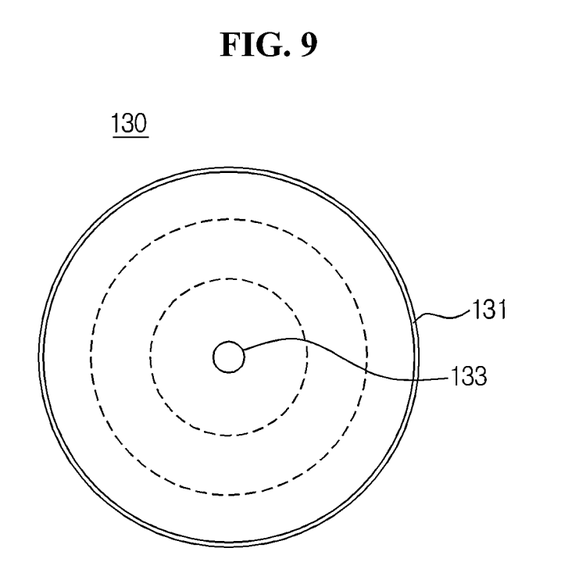
FIG. 9 is a plane view illustrating the bottom of the inside of a metallic casing of FIG. 8.

As shown in FIG. 9, the protrusion 133 for concentricity is formed at the center of the bottom 142 of the metallic casing 130. Since the protrusion 133 for concentricity is located inside the center of the inner cathode terminal 120, the protrusion 133 for concentricity enables the inner cathode terminal 120 to be correctly arranged inside the center of the metallic casing 130. When the protrusion 133 for concentricity is formed integrally with the side 131 and the bottom 142 of the metallic casing 130, the metallic casing 130 is reinforced and consequently has improvement in a shape deformation prevention performance.

FIG. 10 is an actual X-ray image of the electrical energy storage device according to the present invention.

Referring to FIG. 10, it is found that the side 131 of the metallic casing 130 has a thickness gradient such that the side 131 of the metallic casing 130 has a thickness of a portion near the inner cathode terminal 120 larger than that of the other portion. As seen in FIG. 10, the metallic casing 130 has the bead portion 135 on the side 131 thereof to establish a close connection with the inner cathode terminal 120. Accordingly, it is found that the thickness of the portion near the inner cathode terminal 120 is reinforced and as a result, a thickness loss occurring due to beading can be compensated.

As described above, the electrical energy storage device according to the present invention can effectively reinforce the side 131 of the metallic casing 130 near the inner cathode terminal 120 that is weaker against the internal pressure than in the vicinity of the inner anode terminal 110 due to the thickness gradient of the side 131 of the metallic casing 130, thereby improving the pressure resistance characteristics.

Accordingly, the present invention can improve the electrical characteristics and stability of the electrical energy storage device, for example, an ultracapacitor, and simplify the manufacturing process and reduce the manufacturing costs.

According to the foregoing, the connection between the outer terminal and the inner terminal can be improved by the laser welded portion and a close contact is made therebetween, resulting in improved contact resistance characteristics. Also, it is possible to precisely control the size or pitch of the welding points, which makes it easy to control the tensile strength of the welded portion.

Also, the bead portion of the metallic casing is engaged with and closely contacts the beading groove of the inner terminal, thereby achieving a wide contact area and a stable contact, resulting in simple assembly of the metallic casing and the inner terminal and the improved resistance characteristics. Furthermore, the slope portion of the inner terminal can prevent the offset of the inner terminal when contacting the metallic casing, thereby stably maintaining the contact resistance.

Moreover, the side of the metallic casing near the terminal that is relatively weak against the internal pressure is reinforced and consequently resistant against the shape deformation, and the pressure resistance performance can be easily controlled by adjusting the thickness gradient of the side of the metallic casing.

Also, the protrusion for concentricity formed on the metallic casing enables the inner terminal to be correctly arranged inside of the center of the metallic casing, and reinforces the metallic casing, thereby improving the shape deformation prevention performance.

Although the present invention has been described hereinabove, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An electrical energy storage device including a metallic casing to receive a bare cell and first and second terminals located outside of the metallic casing corresponding to each electrode of the bare cell, the electrical energy storage device comprising:
    a plate-like member provided on at least one of the first and second terminals;
    an inner terminal contacting the plate-like member to form the boundary between the inner terminal and the plate-like member; and
    a laser welded portion formed along the boundary between the inner terminal and the plate-like member to connect the plate-like member with the inner terminal;
    wherein the laser welded portion is made up of a plurality of welding points repeatedly formed along the boundary between the plate-like member and the inner terminal, and a distance between the centers of adjacent welding points is within the diameter of the welding points.

2. The electrical energy storage device according to claim 1, wherein a beading groove is formed along the outer periphery of the inner terminal, and the metallic casing has a bead portion closely contacting the beading groove.

3. The electrical energy storage device according to claim 2, wherein a rounded corner is formed between the bottom and the side of the metallic casing to control the internal pressure, and a slope portion is formed on the inner terminal corresponding to the corner of the 5 metallic casing.

4. The electrical energy storage device according to claim 2, wherein the inner terminal is provided corresponding to each of the first terminal and the second terminal, and any one of the inner terminals corresponding to the first terminal and the second terminal closely contacts the bead portion with an insulating member interposed therebetween and the other directly contacts the bead portion.

5. The electrical energy storage device according to claim 1, wherein the metallic casing has a thickness gradient over the side thereof such that the thickness of a portion near the second terminal is larger than the thickness of a portion near the first terminal.

6. The electrical energy storage device according to claim 5, wherein the side of the metallic casing has a thickness of a portion corresponding to the height of the inner terminal corresponding to at least the second terminal larger than the thickness of the other portion.

7. The electrical energy storage device according to claim 5, wherein a ratio of the thickness of the portion near the second terminal to the thickness of the portion near the first terminal is 120 to 150%.

8. The electrical energy storage device according to claim 5, wherein a protrusion for concentricity is formed at the center of at least one terminal of the metallic casing.

9. The electrical energy storage device according to claim 8, wherein the protrusion for concentricity is integrally formed with the body of the metallic casing.

* * * * *